Patented Dec. 12, 1950

2,533,302

UNITED STATES PATENT OFFICE 2,533,302

PREVENTION OF RUST

Franklin M. Watkins, Flossmoor, Ill., assignor to Sinclair Refining Company, New York, N. Y., a corporation of Maine No Drawing. Application September 26, 1947, Serial No. 776,416

7 Claims. (Cl. 44—75)

My invention is concerned with a method for preventing or retarding rusting, especially rusting due to water dissolved or entrained in or settled from petroleum oils, including especially gasoline, kerosene and fuel oils. The method is particularly valuable as applied to prevent rusting in pipe lines.

Rust frequently occurs in pipe lines, storage tanks, etc. and even in automotive and similar equipment because of traces of moisture inevitably present in the fuel or lubricant. Gasoline and kerosene, for example, as they leave the refinery are usually free of occluded moisture but they may contain as much as 0.005–0.01% dissolved moisture. Part of this dissolved moisture separates when the oil is chilled in a storage tank, for instance, and settles as a separate liquid phase beneath the main body of the oil.

Water may also enter oil handling systems along with air through partially filled tanks provided with breather devices. As such a tank cools, for example at night, the contents contract and air laden with moisture enters. This moisture condenses on the walls of the tank, settles to the bottom and dried air is expelled when the contents of the tank again warm up as from the heat of the sun the next day. As will be readily appreciated, repetition of this cycle eventually leaves appreciable amounts of water at the bottom of the tank.

Although several methods have been proposed for preventing rusting in product handling systems, each of these has rather obvious shortcomings. One method, for example, involves drying of the product, as gasoline, by absorption on dehydrated alumina before the product is pumped into pipe lines. Another method involves the introduction into the product of costly chemicals such as hydrogen or mercaptobenzothiazole which react with dissolved oxygen and thereby arrest corrosion. Still another method involves the introduction of water soluble corrosion inhibitors such as sodium nitrite or chromates. Each of these methods is disadvantageous as affording only temporary protection. Sodium nitrite applied to inhibit rusting in pipe lines is frequently decomposed by the action of oxidizing agents present in some crude oils. Hydrogen is quickly lost from vented storage tanks while water soluble inhibitors are lost when they settle to the bottom of storage tanks and are drawn off. Completely water soluble inhibitors are further deficient in many instances in not affording protection in the oil phase.

The rust-inhibiting agent employed in the practice of my invention is inexpensive and readily prepared, is difficult to decompose and provides a high degree of protection in both the oil phase and aqueous phase. Moreover, it is effective in extremely small proportions and over a wide range of temperatures.

The agent to which I refer is p-aminophenol mahogany sulfonate. This material is produced by reacting a sulfuric acid-treated petroleum oil and p-aminophenol, which itself is readily produced by any one of several standard procedures well known in the art, and subsequently adding water to the reaction mixture to cause precipitation of the product. In the reaction with the sulfuric acid-treated petroleum oil, the p-aminophenol should preferably be used in approximately the quantity called for by theory as determined by the acid number of the acid oil. In a typical small scale preparation of a concentrate of the amine sulfonate, 100 grams of an acid-treated oil containing .0239 mole of sulfonic acid and 2.61 grams of p-aminophenol are heated at a temperature of about 180° F., under stirring, for a period sufficient to insure reaction. Thereafter 5 cc. of water is added and the temperature increased to 280° F. The crude product, which is suitable for use without purification, settles out as a black precipitate which is separated by filtration.

In such a run as above the acid oil reacted with the p-aminophenol may test about as follows:

| | |
|---|---|
| Gravity, °API | 29.4 |
| Viscosity at 100° F. SUS | 205 |
| Viscosity at 210° F. SUS | 47.2 |
| Acid number | 13.4 |

This particular acid oil was prepared by treating a mid-continent neutral oil with successive dumps of oleum, a total of 150 pounds of oleum being used for each barrel of oil. Following removal of the separable sludge after the last dump of oleum, the acid oil was blown with air to remove $SO_2$ and settled to remove substantially the last trace of sludge.

As the p-aminophenol mahogany sulfonate is of itself insufficiently oil-soluble to be useful as a rust-inhibitor in oil handling systems, it is incorporated in oil to be inhibited in the form of a solution in a hydrocarbon or other suitable solvent in which it is soluble. Ordinarily I use a 1% solution in benzene. The benzene or other solution of the sulfonate may be added in any amount up to the point where the sulfonate begins to precipitate out. However, in the case of pipe lines, I generally incorporate only enough of the solution to give a sulfonate concentration of from 1 to 100 parts per million.

The rust-inhibiting property of the sulfonate finds wide application. Thus, in addition to being useful in inhibiting rusting in storage tanks, pipe lines, etc., it may be blended with oils of suitable characteristics to provide lubricating compositions which will retard the corrosion of iron and steel surfaces with which they come into contact. The exact amount of the sulfonate employed in the preparation of such compositions depends on the degree of protection required and other factors including the extent to which the sulfonate may be made to dissolve in the particular base oil, the viscosity of the base oil, etc. Highly effective slushing and needle oils can be prepared by blending the solution of the sulfonate with oils conventionally used in slushing and needle oil manufacture. These oils are applied to clean metal surfaces as by spraying, brushing or dipping to protect the surface from corrosion by atmospheric moisture or accidental moisture spray.

Objects or articles susceptible to attack by moisture with resultant corrosion, and which may be treated with oil-base compositions prepared according to my invention include, for example, accurately machined parts such as piston rings, pump plungers, etc., steel castings, which are frequently stored in the open for long periods, idle machinery, storage drums, tools and the like.

The suitability of the p-aminophenol mahogany sulfonate for rust-inhibiting compositions of various types is demonstrated by subjecting blends containing the sulfonate to a test analogous to ASTM designation D-665-42T. According to this test, as modified for my purposes, a polished mild steel strip is suspended in a beaker fitted with a mechanical stirrer and containing 350 mls. of the test blend. The blend is stirred for 30 minutes after which 50 mls. thereof is removed and 30 mls. of distilled water substituted. Stirring is continued for 48 hours and the strip then inspected for rust.

The appended table compares the effectiveness of p-aminophenol mahogany sulfonate in the described test with other amine mahogany sulfonates and representative metal mahogany sulfonates. In the tests of the table kerosene was employed as the inhibited oil and the p-aminophenol sulfonate was added to the kerosene as a 1% solution in benezene.

Table

| Sulfonate | Additive Concentration, Lbs./1,000 Bbls.[1] | Rust Rating[2] |
|---|---|---|
| Blank | | E |
| *Amine Sulfonates* | | |
| p-aminophenol sulfonate | 25 | A |
| Laurylamine sulfonate | 100 | C |
| Ethylamine sulfonate | 25 | B |
| Naphthenylamine sulfonate | 25 | D |
| Triamylamine sulfonate | 100 | B+ |
| Ethanolamine sulfonate | 18 | B |
| *Metal sulfonates* | | |
| Cadmium sulfonate | 36 | B |
| Calcium sulfonate (basic) | 25 | B |
| Cobaltous sulfonate | 25 | D |
| Manganese sulfonate | 25 | D |
| Nickel sulfonate | 25 | D |

[1] Of a concentrate containing 10% sulfonate.
[2] Rust rating:
A = no rust on strip.
B+ = up to 5% of surface rusted.
B = 5-25% of surface rusted.
C = 25-50% of surface rusted.
D = 50-75% of surface rusted.
E = 75-100% of surface rusted.

I claim:
1. The method of inhibiting the rusting of iron and steel surfaces which comprises maintaining a suitably concentrated petroleum oil distillate solution of p-aminophenol mahogany sulfonate in contact with such surfaces, said petroleum oil distillate being selected from the group consisting of gasoline, kerosene and fuel oil.
2. A petroleum oil distillate base composition effective for retarding rusting of iron and steel surfaces which comprises p-aminophenol mahogany sulfonate as an active rust-inhibiting component, said petroleum oil distillate being selected from the group consisting of gasoline, kerosene and fuel oil.
3. A petroleum oil distillate to which a rust-inhibiting property has been imparted by the incorporation of an effective concentration of p-aminophenol mahogany sulfonate, said petroleum oil distillate being selected from the group consisting of gasoline, kerosene and fuel oil.
4. Gasoline to which a rust-inhibiting property has been imparted by the incorporation of an effective concentration of p-aminophenol mahogany sulfonate.
5. Kerosene to which a rust-inhibiting property has been imparted by the incorporation of an effective concentration of p-aminophenol mahogany sulfonate.
6. Fuel oil to which a rust-inhibiting property has been imparted by the incorporation of an effective concentration of p-aminophenol mahogany sulfonate.
7. Method of preventing the rusting of pipe lines, storage tanks, and other petroleum refinery equipment which comprises incorporating in the petroleum oil distillate introduced into the equipment an effective amount of p-aminophenol mahogany sulfonate, said petroleum oil distillate being selected from the group consisting of gasoline, kerosene and fuel oil.

FRANKLIN M. WATKINS.

REFERENCES CITED

The following references are of record in the file of this patent:

UNITED STATES PATENTS

| Number | Name | Date |
|---|---|---|
| 2,125,305 | Murphy | Aug. 2, 1938 |
| 2,298,636 | Prutton | Oct. 13, 1942 |
| 2,333,206 | Sloan | Nov. 26, 1943 |
| 2,401,993 | Wasson et al. | June 11, 1946 |
| 2,412,634 | Schwartz | Dec. 17, 1946 |